United States Patent Office 2,983,319
Patented May 9, 1961

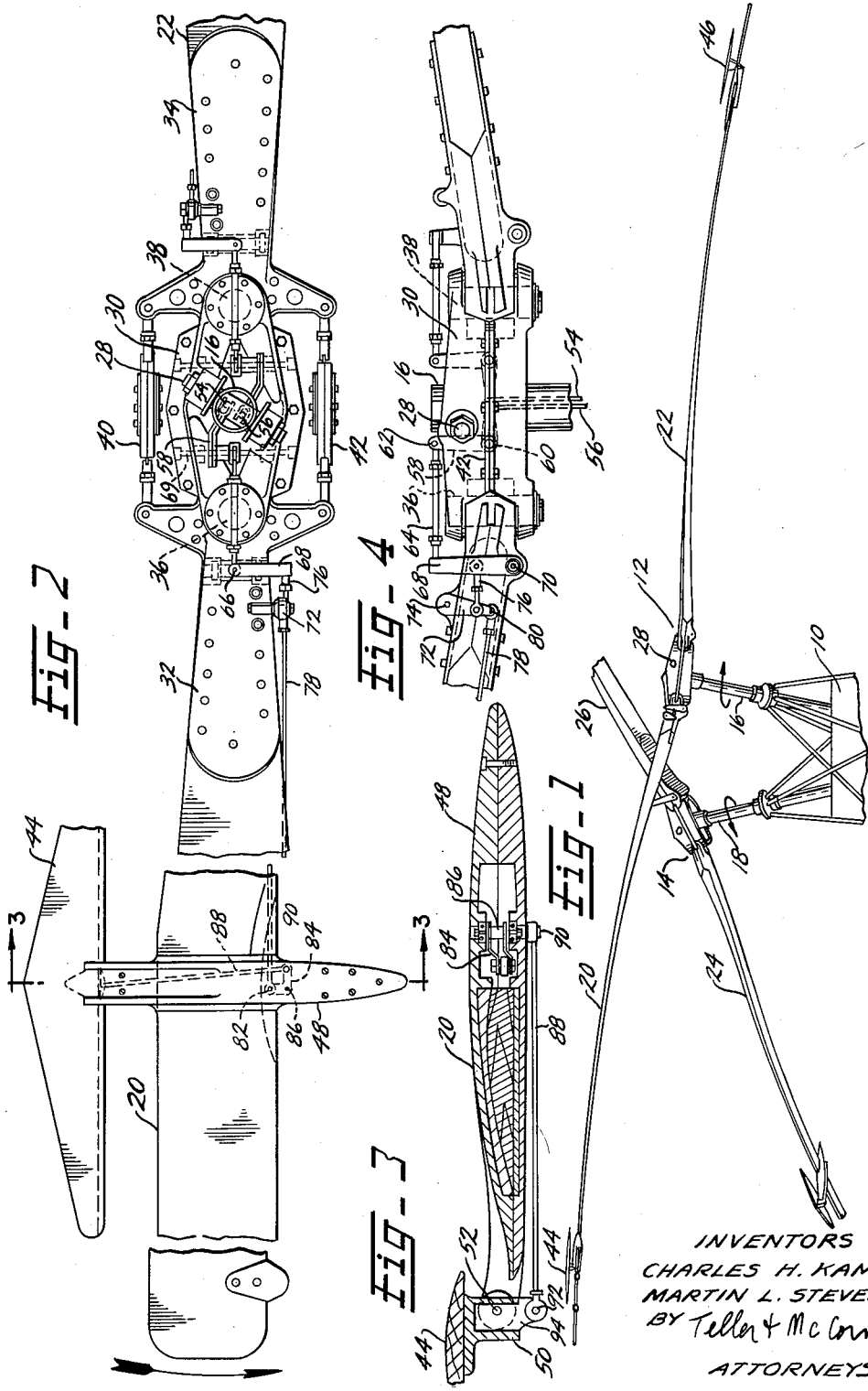

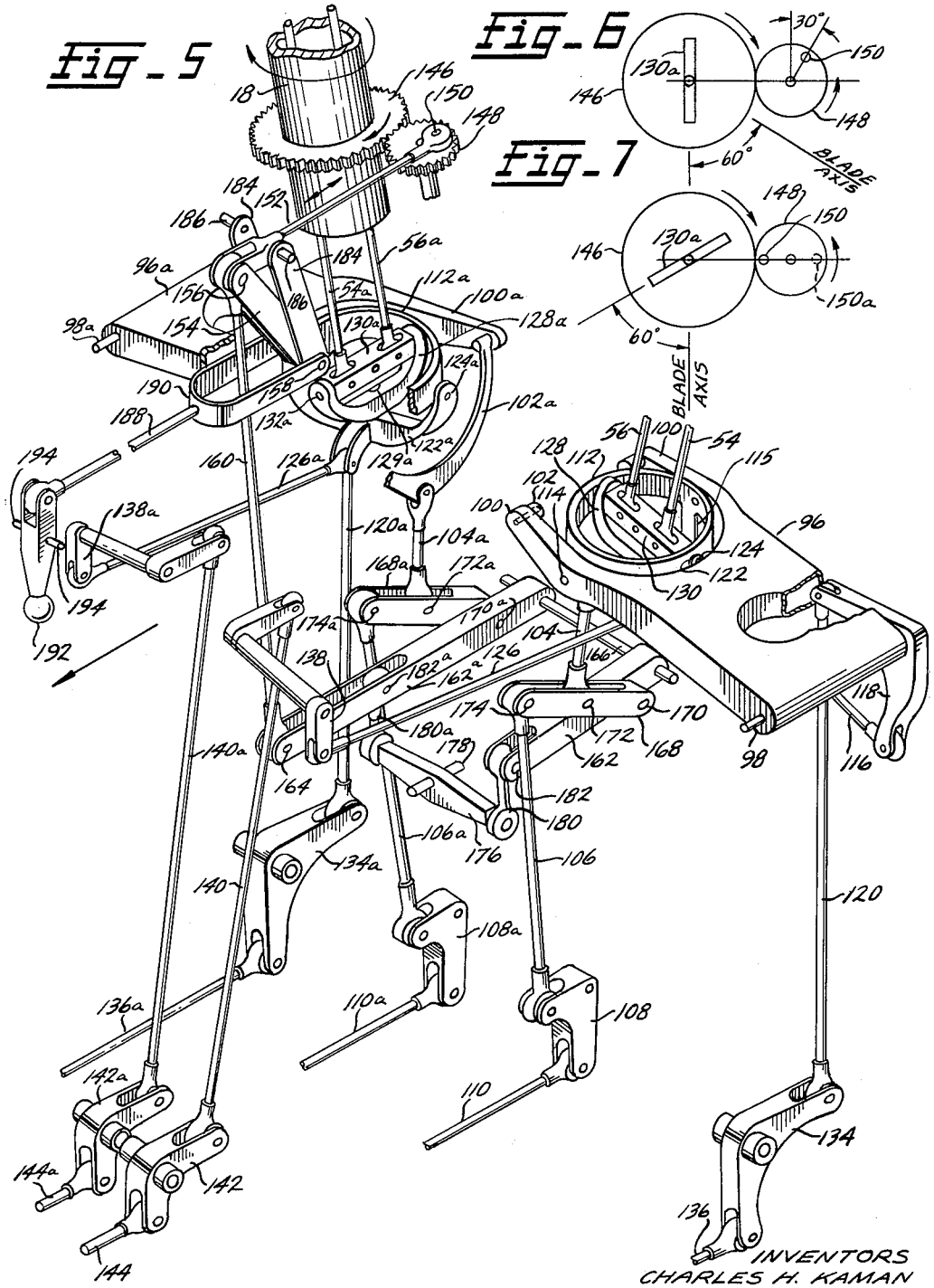

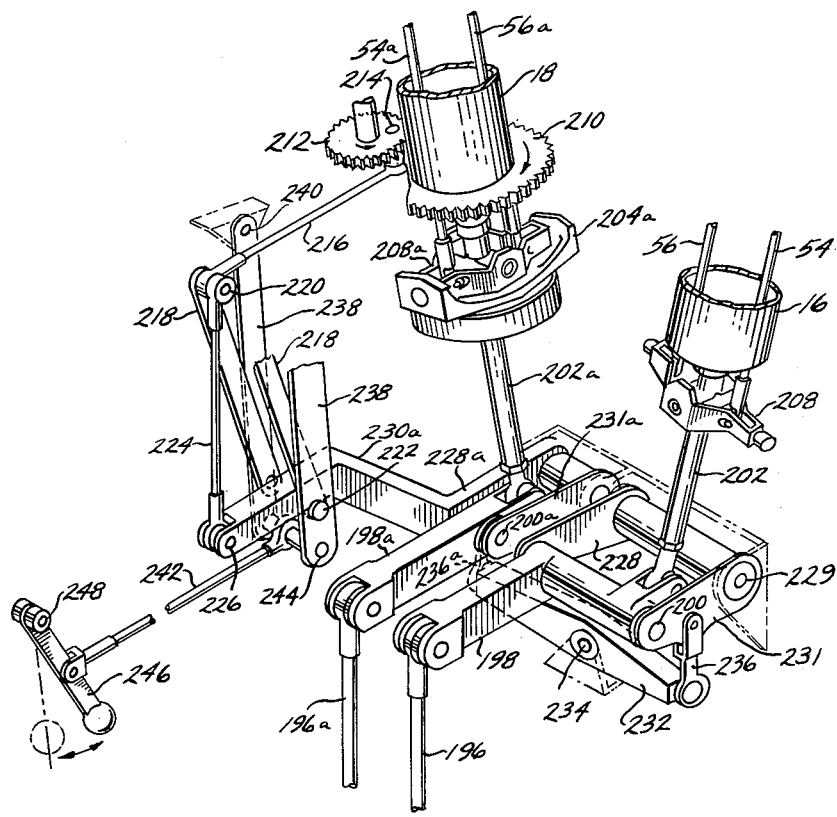
Fig_8
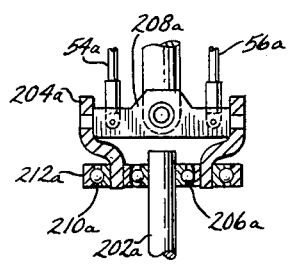
Fig_9
INVENTORS
CHARLES H. KAMAN
MARTIN L. STEVENS
BY
Teller + McCormick
ATTORNEYS

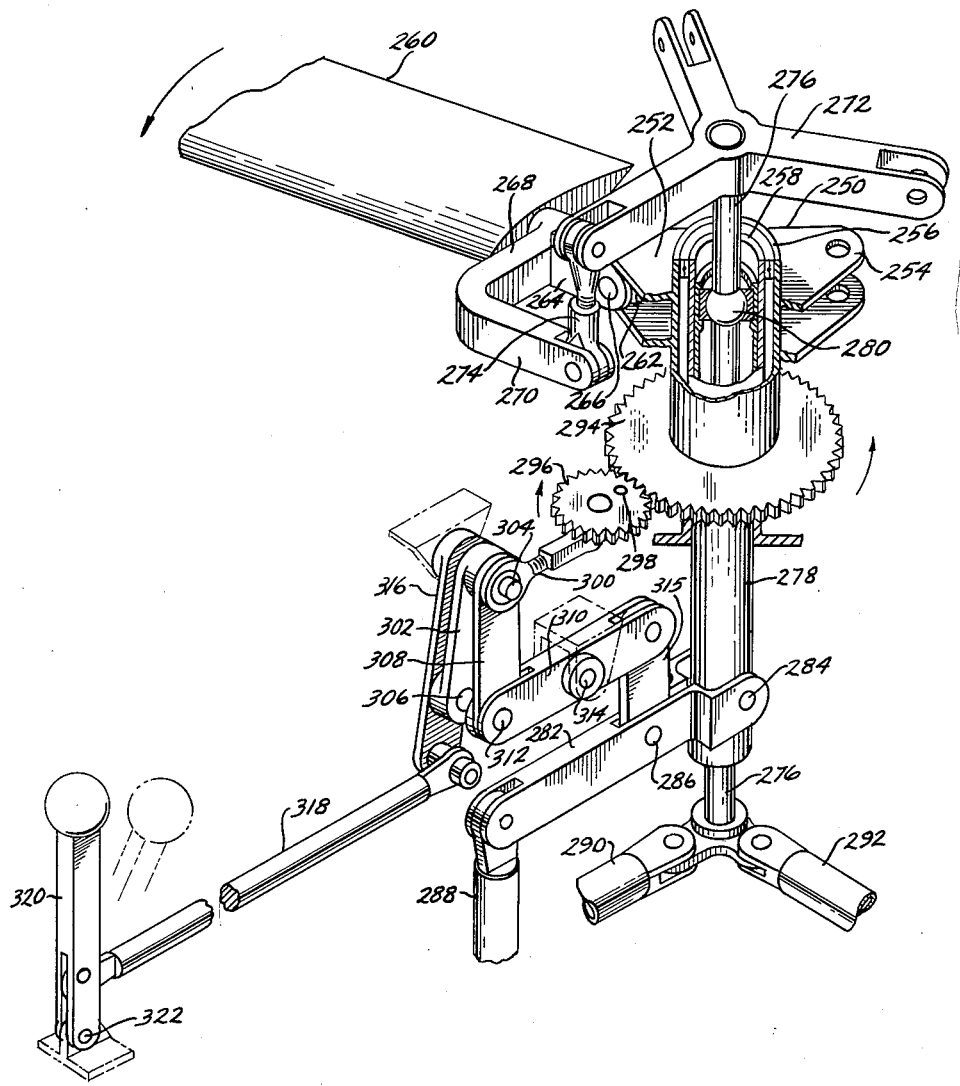

2,983,319
HARMONIC ANTI-VIBRATION MEANS FOR A HELICOPTER

Charles Kaman, Simsbury, and Martin L. Stevens, West Hartford, Conn., assignors to The Kaman Aircraft Corporation, Bloomfield, Conn., a corporation of Connecticut Filed Mar. 1, 1956, Ser. No. 568,823
26 Claims. (Cl. 170—135.22)

The average lift produced by a rotor of a helicopter is dependent upon the rotational speed of the rotor and upon the average pitch of the blade relative to the plane of rotation, this resulting from the collective pitch setting. Normal helicopter practice is to operate the rotor at nearly constant speed and to change the average lift by changing the collective pitch. This change in collective pitch is under the control of the pilot or of an automatic control system, and it is used to maneuver the helicopter in a vertical direction. An increase in the collective pitch causes an upward motion or climb of the helicopter, and a decrease in collective pitch causes a downward motion of the helicopter.

When a helicopter rotor is stationary with respect to the surrounding air mass or is moving only upwardly or downwardly, the air flow on all of the blades is the same at all times. However, when the rotor is so oriented that its hub has a horizontal movement relative to the surrounding air mass, as for instance in forward flight, the aforesaid symmetry of air flow no longer exists. A blade located so that its instantaneous velocity due to rotation is in the same direction as the hub movement, has a higher velocity relative to the air than that of an oppositely located blade, upon which the velocity due to rotation and that due to hub motion are in opposite directions, and must be subtracted one from the other. These asymmetries in air velocity cause the lift of a blade to vary from instant to instant, depending on the position of the blade relative to the direction of hub motion. The lift variations so produced are sources of vibratory stresses on the rotor blade itself and tend to produce a vibratory motion of the entire helicopter.

The lift variations due to the changes in velocity which take place during rotation of the blade about the bodily moving hub are variations which repeat exactly during every revolution of the rotor blade about the hub. These variations therefore take place at the rotational speed of the rotor and at harmonics or integral multiples of this speed. Ordinarily the blades of a helicopter rotor are so connected with the hub that they are freely movable within certain limits about flapping axes perpendicular to the hub axis. Except for the flapping axes, there would be one primary vibration per revolution for each blade. The movements of the blades about said flapping axes tend to smooth out or at least greatly reduce the lift variations that would otherwise be transmitted as vibrations to the hub and to the fuselage. While the permitted movements about the flapping axes largely eliminate the primary vibrations, first and possibly other integral harmonics of said vibrations remain and these are frequently sufficient to be objectional and to make elimination thereof necessary or desirable.

The above-mentioned first harmonics of the primary one per revolution vibrations occur at the rate of two per revolution for each blade. When the rotor has two opposite blades, the second of the two vibrations per revolution resulting from one blade coincides with the first of the two vibrations per revolution resulting from the other blade and there are still two vibrations per revolution.

When the rotor has more than two blades, vibrations caused by blade air loads at rates per revolution of less than the number of blades are self-cancelling at the rotor hub. Only vibrations at a rate per revolution equal to an integral multiple of the number of blades are transmitted to the helicopter. For a rotor having three blades the lowest rate of vibration is therefore three vibrations per revolution.

The general object of the invention is to provide a mechanism for substantially eliminating the rotor produced harmonic vibrations that tend to occur as above explained, this mechanism serving to impart to the blades of the rotor impulses or pitch changes so timed and of such magnitude that they cancel or substantially cancel the said vibrations.

More specific objects of the invention are to provide various features of mechanism that make it possible to provide the aforesaid impulses or pitch changes.

In the drawings we have shown three embodiments of the invention, but it will be understood that various changes may be made from the constructions shown, and that the drawings are not to be construed as defining or limiting the scope of the invention, the claims forming a part of this specification being relied upon for that purpose.

Of the drawings:

Fig. 1 is a perspective view of the upper portion of a helicopter having two rotors, said helicopter having been selected as an example of a helicopter in which may be incorporated a harmonic anti-vibration means embodying the invention.

Fig. 2 is an enlarged fragmentary plan view of one of the rotors shown in Fig. 1.

Fig. 3 is a transverse sectional view taken along the line 3—3 of Fig. 2.

Fig. 4 is a fragmentary side view of the rotor shown in Fig. 2 with certain parts omitted.

Fig. 5 is a schematic perspective view showing the more important parts of the pitch control mechanism of the helicopter shown in Figs. 1 to 4 and also showing a harmonic anti-vibration means combined with said mechanism and embodying the invention.

Fig. 6 is a fragmentary schematic view illustrating the timing of the anti-vibration means.

Fig. 7 is a view similar to Fig. 6 but showing the parts in different relative positions.

Fig. 8 is a schematic perspective view showing the more important parts of a somewhat different pitch control mechanism and of an alternative harmonic pitch changing means combined therewith.

Fig. 9 is a fragmentary vertical sectional view of some of the parts shown in Fig. 8.

Fig. 10 is a schematic perspective view showing portions of a helicopter of a different type and showing an alternative pitch control mechanism and also showing an alternative harmonic anti-vibration means combined with said alternate mechanism and embodying the invention.

*General organization of helicopter—Figs. 1 to 4*

The invention as to certain aspects thereof is of general applicability, but as to other aspects it is particularly adapted for a helicopter of the type disclosed in the Kaman and Stevens Patent No. 2,695,674 dated November 30, 1954 for Control System for Multiple Rotor Helicopters. The invention will be first described as applied to a helicopter of said type. Fig. 1 is a view showing a portion of such a helicopter, said view being taken from the left of the helicopter and toward the rear. Figs. 2, 3 and 4 show in greater detail one of the rotors of said helicopter. Reference is made to said patent for a more complete disclosure of any details not herein fully disclosed.

The helicopter, as shown, comprises a fuselage 10 and closely adjacent left and right rotors 12 and 14 which are spaced transversely and which are connected with left and right supporting and driving shafts 16 and 18. Each rotor is multi-bladed and as shown each rotor has two opposite blades. The rotor 12 has blades 20 and 22 and the rotor 14 has blades 24 and 26. Said shafts 16 and 18 extend upwardly from said fuselage 10 and they are hollow or tubular for reasons to be set forth. As shown, the shafts 16 and 18 diverge upwardly, but said shafts and their axes of rotation will, for convenience, be sometimes referred to as being substantially vertical. The said shafts and rotors are driven by a suitable engine, not shown, and said shafts are interconnected for rotation in unison and in opposite directions as indicated in Fig. 1. The rotors 12 and 14 are so connected with the shafts that their blades are in intermeshing relationship during rotation. The two blades are spaced transversely, and the direction perpendicular to the direction of rotor spacing is the longitudinal direction. When the rotors have two blades each, the relationship is such that the blades of each rotor are transverse when the blades of the other rotor are longitudinal.

In order that the manner of operation of the hereinafter described vibration control mechanism may be fully understood, one rotor and the pitch changing mechanism therefor, and more particularly for one blade thereof, will be described. In a helicopter of the type identified the two blades are rigidly connected with each other and are movable in unison about a common teetering axis which serves as the before-mentioned flapping axis for both blades. Extending through horizontal bearing apertures in the upper part of the shaft 16 is a horizontal pivot pin 28 which provides the said teetering axis. Said pin serves to pivotally connect a hub member 30 with the shaft, said hub member having a large central aperture through which the upper end of the shaft extends. The teetering pin 28 is so located with respect to the hub member that the axis of pivotal movement of said hub member is at an acute angle, preferably about 60°, with respect to the longitudinal axes of the blades 20 and 22. The said angle is such that each end of the pivot pin 28 is at the leading side of the longitudinal axis of the corresponding blade.

Two blade supports 32 and 34 are provided at the ends of the hub member 30, these blade supports being connected with the hub member by means of vertical hinge pins 36 and 38 for pivotal movement about vertical drag axes. The inner end or root portions of the blades 20 and 22 are connected with the respective blade supports. In order that the two blade supports with their corresponding blades may move substantially in unison about said axes 36 and 38, said blade supports are interconnected by link means 40 and 42, each of the said link means being variable in length and including a damper which resists variations in length. For more clearly showing other parts, the link 42 is omitted in Fig. 4.

*Pitch means on rotors—Figs. 1 to 4*

As has been described, the two blades of each rotor are pivotally movable in unison about the substantially horizontal teetering axis of the pin 28 and they are also pivotally movable about the substantially vertical drag axes at 36 and 38. In addition, the blades are adjustable about substantially radial axes extending longitudinally of the blades for the purpose of changes of pitch. The pitch means on the rotor for effecting the necessary changes may be widely varied within the scope of the invention, but the means shown is the same as that disclosed in said Patent 2,695,674.

Said pitch means includes auxiliary aerofoil flaps 44 and 46 on the outer end portions of the blades 20 and 22, said flaps being angularly movable relatively to the blades about axes substantially parallel with said longitudinal axes of the blades. Similar flaps are provided on the blades of the other rotor 14. Each flap 44 or 46 may be adjusted angularly about the said longitudinal axis of the corresponding blade, and when the blades 20 and 22 are rotating, the flaps 44 and 46 serve by reason of aerodynamic forces acting thereon to adjust the blades and to thus change their effective pitches.

As shown, each blade is rigidly held at its inner end or root portion so as to prevent any relative rotative movement of said root portion about an axis extending longitudinally of the blade. Each blade is initially positioned as shown in Figs. 2 and 3, but said blade is capable of substantial twisting about its longitudinal main axis and with respect to its nonrotatable root portion so that its effective pitch is changed as the result of the twisting. The blade has torsional resiliency which tends to restore it to its initial normal position and shape after twisting. The before-described flaps 44 and 46 serve aerodynamically to twist the corresponding blades and thus change the pitches thereof.

The said pitch means also includes connections for relatively moving the flaps and for thus changing the blade pitches. These flap moving connections include rotary parts carried by the blades and the hub and also include other rotary and nonrotary parts. The first said rotary parts for the flap 44 on the blade 20 will be described with particular reference to Figs. 2, 3 and 4, it being understood that the corresponding parts for the other flap 46 are similar. A bracket 48 is provided for pivotally connecting the flap 44 with the blade 20, and said bracket preferably fits around the blade. Secured to the flap 44 is a bracket 50 and this bracket is connected with the bracket 48 for pivotal movement about an axis at 52 substantially parallel with the mean axis of the blade.

A vertical link or rod 54 is provided which is located within and rotatable with the hollow shaft 16, said rod being movable vertically. A similar rod 56 is provided for the flap 46 on the blade 22. The rod 54 is connected at its upper end with one arm of a bell crank 58 which is pivoted at 60 on the hub member 30 for movement about a horizontal axis. The axis at 60 is perpendicular to the longitudinal axis of the blade 20 when the blade is in the position shown and is perpendicular to a vertical plane through the drag axes at 36 and 38. The other arm of the bell crank 58 is connected at 62 with one end of a link 64. The opposite end of the link 64 is connected at 66 with a lever 68 which is pivotally connected to the blade support 32 for movement about a horizontal axis at 70 extending transversely of the blade. A second lever 72 is pivoted to the blade support 32 for movement about a horizontal axis at 74 also extending transversely of the blade. The two levers 68 and 72 are connected by a link 76. A push-pull link or rod 78 extends longitudinally of the blade 20 along the leading edge thereof, the inner end of the link being pivotally connected with the lever 72 at 80. The outer end of the rod 78 is pivotally connected at 82 with one arm of a bell crank 84 which is pivotally connected with the bracket 48 for rotation about a vertical axis at 86. A link 88 is pivotally connected at its forward end at 90 with the other arm of the bell crank 84. The rearward end of the link 88 is pivotally connected at 92 with an extension 94 formed integrally with the bracket 50 which carries the flap 44.

Aerodynamic action on the flaps 44 and 46 during rotor rotation serves to apply downward forces or upward forces to the trailing portions of the blades 20 and 22, the direction of said forces being dependent upon the aerofoil shape and the angular positions of the flaps. For normal flight, each flap is moved relatively clockwise from the Fig. 3 position so that it has a negative effective pitch, and aerodynamic action on the flap during rotation serves to apply a downward force at the trailing portion of the corresponding blade. This downward force twists the blade in the counterclockwise direction to increase the positive pitch thereof. When the flap is moved relatively counterclockwise to decrease the negative pitch thereof, there is a reversed or clockwise twisting of the blade with a resultant decreased positive blade pitch.

Referring particularly to the flap 44 and the connections therefor, it will be observed that when the rod 54 is moved upwardly, the bell crank 58 is moved counterclockwise and the levers 68 and 72 are swung outwardly and the push-pull rod 78 is moved outwardly. Outward movement of the rod 78 causes rearward movement of the link 88, thus moving the flap 44 upwardly or clockwise to increase the negative flap pitch and to thus increase the positive pitch of the blade. When the rod 54 is moved downwardly, the described movements are reversed and the flap 44 is moved downwardly or counterclockwise to decrease the negative flap pitch and to thus decrease the positive pitch of the blade.

*Pitch control mechanisms—Fig. 5*

The pitch control mechanisms for the two rotors are shown in Fig. 5 and will be described. As has been before stated, the rotors are spaced transversely and the direction perpendicular to the transverse spacing is the longitudinal direction. The flight of the helicopter, while not so limited, is normally longitudinal and in the direction of the arrow in Fig. 5.

In some instances, parts of one pitch control mechanism or the other are omitted from Fig. 5 or not clearly shown, but it will be understood that the two mechanisms are similar except for reversal of parts. The description relates primarily to the left mechanism for the rotor 12 on the left shaft 16, but in some instances the description refers more particularly to parts of the right mechanism when the last-mentioned parts are more clearly shown. The parts of the right mechanism, so far as shown, are designated by the same numerals as those for the left mechanism but with "a" added.

Fig. 5 shows schematically a portion of said right shaft 18 but omits the similar left shaft 16. The gearing for rotating the two shafts in unison and in opposite directions is omitted. Said Fig. 5 shows the lower portions of the vertically movable rods for changing blade pitches and also shows schematically the pitch control mechanisms connected with said rods.

The rods 54 and 56 for the flaps on the two blades of the left rotor 12 are connected with suitable pitch control mechanism in the fuselage for moving them vertically to change the blade pitches in the manner described. Similarly the rods 54ª, 56ª for the flaps and the two blades of the right rotor 14 are connected with a similar pitch control mechanism. By means of said rods 54, 56 and 54ª, 56ª the blade pitches for the two rotors may be changed collectively or cyclically, all as fully explained in said Patent 2,695,674. The two rods of each pair are moved upwardly or downwardly in unison and to uniform extents for collective changes in pitch and they are moved upwardly or downwardly separately and to uniform extents for cyclic changes in pitch. As explained in connection with Fig. 11 of said patent, each two control rods such as 54, 56 for each rotor cross each other within the corresponding hollow shaft.

The left mechanism comprises a supporting plate 96 which is pivotally mounted at its outer end for movement about a longitudinal axis. As shown, a longitudinal pivot rod 98 extends through a longitudinal aperture in the plate 96, the rod 98 being fixedly supported on the fuselage by means not shown. The supporting plate 96 has a large recess adjacent its inner end with arms 100, 100 at opposite sides of the recess. A yoke 102 having the shape of an inverted arch is positioned between the arms 100, 100 near the outer ends thereof, the said yoke being connected with the said arms for pivotal movement about a longitudinal axis. In Fig. 5 the right yoke 102ª is more clearly shown than is the left yoke 102. Centrally connected with the yoke 102 near the bottom thereof is a vertically extending link 104. When the link 104 is moved upwardly or downwardly the yoke 102 is similarly moved upwardly or downwardly and the plate 96 is swung upwardly or downwardly about its pivotal axis at 98. The rods 54, 56 are indirectly connected with the plate 96 so that upward and downward movements of the plate cause similar movements of the rods. Said rods 54, 56 are further so connected with the plate 96 that they can rotate relatively thereto in conformity with the rotation of the corresponding shaft 16.

The generally vertically extending link 104 is connected, indirectly and by means to be explained, with a generally vertically extending link 106. The link 106 is connected with a bell crank 108 which in turn is connected with a longitudinal link 110. The links 110 and 110ª of the two mechanisms are connected at their forward ends with pilot operable or other control devices for moving said links in such a manner as to control the collective pitches of the rotor blades. Said devices may be those disclosed in detail in said Patent 2,695,674. It will be seen that forward movement of said links 110, 110ª causes upward movement of said links 106, 106ª and 104, 104ª and upward movement of said supporting plates 96, 96ª and upward movement of said rods 54, 56 and 54ª, 56ª. As previously explained, upward movement of the last said rods causes increased blade pitches, and thus forward movement of the links 110, 110ª causes increased blade pitches. Rearward movement of the links 110, 110ª causes decreased blade pitches. By manipulating the two links 110 and 110ª the collective pitches of the blades of both rotors can be increased or decreased simultaneously and to the same extent or said pitches can be increased or decreased differentially.

The connection between rods 54, 56 and the plate 96 is such that said rods may be moved relatively to said plate for cyclic pitch changes. For this purpose, a gimbal ring 112 is located in the space between the arms 100, 100 of said plate 96, said ring being pivotally connected with said arms for pivotal movement about preferably longitudinal axis at 114. The last said axis intersects the axis of rotation of the corresponding rotor shaft 16. The gimbal ring 112 is provided with a downwardly extending arm 115 and a link 116 is pivotally connected at its inner end with the said downwardly extending arm. The outer end of the link 116 is pivotally connected with one arm of a bell crank 118, the bell crank being pivotally movable on the pivot rod 98 which supports the plate 96. The other arm of the bell crank 118 is pivotally connected with a vertical link 120. When the link 120 is moved downwardly the link 116 is moved outwardly and the gimbal ring 112 is moved about its pivotal axis at 114 in the counterclockwise direction. When the link 120 is moved upwardly the link 116 is moved inwardly and the gimbal ring is moved about its said axis in the clockwise direction.

Referring more particularly to the right mechanism, an element 122ª is connected with the gimbal ring 112ª, this element preferably being a yoke having the shape of an inverted arch and embracing the said gimbal ring. The ends of the element 122ª are pivotally connected with the ring for movement about an axis at 124ª which axis intersects the axis of rotation of the rotor shaft 18 and is perpendicular to the longitudinal pivotal axis of the ring 112ª. Pivotally connected with a downward extension on said element 122ª is a longitudinal link 126ª. When the link 126ª is moved longitudinally the element 122ª is swung about its axis at 124ª. Positioned partly within the gimbal ring 112ª is an azimuth member which is preferably a yoke 128ª. The azimuth member or yoke 128ª is pivotally connected with the element 122ª for rotation about a central azimuth axis at 129ª. When the parts are in the positions shown in Fig. 5, said axis 129ª is in alignment with the axis of rotation of the rotor shaft 18. Positioned within the azimuth member 128a is an azimuth bar 130a, this bar being pivotally connected at its ends with the azimuth member 128a for movement about an axis at 132a which intersects the axis of rotation of the rotor shaft 18. The axis at 132a and the shaft axis are perpendicular when the azimuth bar is in the position shown, but the bar 130a and the axis 132a are adjustable to other angular positions as will be explained. The rods 54a and 56a are pivotally connected at their lower ends with said azimuth bar 130a at opposite sides of the central azimuth axis at 129a. Said rods are guided in the hollow shaft 18 in such a manner that they rotate with the shaft and serve to rotate said bar 130a and said member 128a relatively to said element 122a and about said azimuth axis 129a. The azimuth bar 130a and the axis 132a may be assumed to be in the same rotative position as the teetering pin 28 and it will therefore be apparent from Fig. 2 that each blade trails an extension of said axis 132a by an angle of about 60°.

The generally vertically extending link 120 for the left rotor is connected with a bell crank 134 which in turn is connected with a longitudinal link 136. The longitudinally extending link 126 is connected with a bell crank 138 which in turn is connected with a generally vertically extending link 140. The link 140 is connected at its lower end with a bell crank 142 which in turn is connected with a longitudinally extending link 144. Similar parts are provided for the right rotor.

It will be seen that forward movement of the links 136, 136a would cause pivotal movements of the gimbal rings 112, 112a about the axes such as that at 114, the ring 112 moving in the counterclockwise direction and the ring 112a moving in the clockwise direction. Rearward movement of the links 136, 136a would cause pivotal movement of the gimbal rings in the directions opposite to those last stated. Actually the links 136 and 136a are ordinarily moved in opposite directions so that the gimbal rings are moved in the same direction. It will be seen that forward movement of the links 144, 144a moves the links 126, 126a forwardly and thus would cause pivotal movements of the control members such as 122a in the forward direction about the axes such as that at 124a. Rearward movement of said links 144, 144a would cause pivotal movements of said control elements in the directions opposite to those last stated. By manipulating the four links 136, 136a, 144, 144a the azimuth axes such as that at 129a can be inclined in any direction. This causes the rods 54, 56, 54a, 56a to be vertically moved cyclically so as to cyclically change the pitches of the blades of the two rotors, all as more fully explained in said Patent 2,695,674.

The links 132, 132a, 144, 144a of the two mechanisms are connected at their forward ends with pilot operable or other control devices for moving said links in such a manner as to cyclically control the pitches of the blades of the rotors as above stated. Said control devices may be those disclosed in detail in the last said patent. From the foregoing description it will be apparent that the supporting or control members 96 and 96a are substantially vertically movable and serve upon upward or downward movement to collectively increase or decrease the pitches of the blades. The control members 96 and 96a respectively carry rotatable swash or azimuth members 128 and 128a, which are rotatable about axes at 129, said axes being angularly movable to any direction of inclination so as to cyclically change the pitches of the blades in any required manner. Summarizing, each control member is adjustable vertically and each azimuth member is adjustable angularly to change the pitches of the blades collectively and cyclically in accordance with a normal pitch pattern as required for flight.

*Harmonic anti-vibration means—Fig. 5*

In accordance with the invention, a means is provided for imparting similar and simultaneous impulses to all of the blades of the rotor an integral plurality of times during each rotation of the rotor. Preferably and as shown, impulses are imparted to all of the blades in unison. The term "integral plurality" will be understood as referring to a whole number and as excluding any fractional number. Reference has heretofore been made to the vibrations that tend to occur at a frequency which is a function of the speed of rotation and of the number of rotor blades. The frequency of said vibrations is always equal to the speed of rotation multiplied by an integral plurality, which is equal to the number of rotor blades. While the invention is not necessarily so limited, the above-mentioned impulses or pitch changes may be assumed to be for the purpose of cancelling vibrations.

During helicopter flight the before-described normal pitch control mechanism is operable for changing the pitches of the rotor blades collectively or cyclically or both in accordance with a normal pattern as required for said flight. The term "normal pitch pattern," as hereinafter used, designates the summation of a pilot chosen collective pitch and of a pilot chosen repetitive sequence of cyclically varying pitches, together with those pitch changes, if any, that may result from the normal flapping movements of the blades. Preferably the impulses that are applied to the blades for cancelling vibrations are obtained by causing the pitch control mechanism to superimpose brief pitch changes upon said normal pitch pattern which pattern is otherwise maintained, said superimposed pitch changes being similar and simultaneous for all of the blades and being effected and integral plurality of times during each rotation of the rotor.

The anti-vibration means may be widely varied as to details of construction and it must conform to the necessary extent to the construction of the pitch control mechanism of the particular helicopter involved. Fig. 5 of the drawings shows an anti-vibration mechanism of the pitch changing type adapted for a helicopter having two rotors as hereinbefore described in detail, but it will be understood that the invention is not limited to a two rotor helicopter of the particular type shown and described nor even to a two rotor helicopter. When the rotor has two blades there are ordinarily two impulses or pitch changes during each rotation.

The anti-vibration means as shown and described comprises an actuating mechanism separate from the rotor or rotors and connected therewith for operation in synchronism with the rotation thereof, and said anti-vibration means comprises a connection between said actuating mechanism and the pitch control mechanism for all of the blades of the helicopter for causing the last said mechanism, while otherwise maintaining the before-mentioned normal pitch pattern, to simultaneously change the pitches of said blades from said pattern and restore them thereto an integral plurality of times during each rotation of the rotor.

The disclosed actuating mechanism includes a gear 146 connected with one of the rotor carrying shafts, which may be the shaft 18, and said mechanism also includes a gear 148 which meshes with the gear 146 and is rotatable about a fixed axis parallel with said shaft. The gear 148 has one-half as many teeth as the gear 146 and therefore makes two rotations for each rotation of said gear 146. The gear 148 carries an eccentric pin 150 and said pin constitutes a relatively movable part having an integral plurality of repetitive movements during each rotation of the rotor. Said gears 146 and 148 are hereinafter sometimes referred to respectively as the "first" and "second" gears.

The connection between the actuating mechanism and the pitch control mechanism includes a generally longitudinal link 152 which engages at its rear end with said pin 150. The link 152 is connected at its forward end with a rock lever 154, the connection between the link and the lever being at a transverse horizontal axis 156.

Sufficient flexibility is provided to permit the link 152 to oscillate in accordance with the movement of the pin 150. The rock lever 154 is oscillable about the axis of two aligned transverse horizontal pivot pins 158 which are spaced apart, said axis being near the lower end of said lever. A generally vertical link 160 is pivotally connected at its upper end with said link 152 and with said rock lever 154, and said link is connected at its lower end with a generally longitudinal rock lever 162$^a$, the connection being at a horizontal transverse axis 164. The lever 162$^a$ is pivotally movable on a fixed horizontal transverse pin 166, said lever being oscillable upwardly and downwardly. From the foregoing description it will be apparent that as the gears 146 and 148 of the actuating mechanism are rotated, the link 152 reciprocates longitudinally. As the link 152 reciprocates, the rock lever 154 oscillates on the pins 158 and the link 160 reciprocates vertically. The vertical reciprocations of the link 160 causes the lever 162$^a$ to oscillate, the lever making two oscillations for each rotation of the shaft 18 and of the rotor 14.

It has been stated that the link 104$^a$ is indirectly connected with the link 106$^a$. The links are so connected by means of a rock lever 168$^a$ which is generally longitudinal and which is pivotally connected at its rear end for oscillation about a horizontal transverse pivotal axis. The last said pivotal axis is provided by a pin 170$^a$ carried by the lever 162$^a$ at a position spaced forwardly from the stationary pivot pin 166. The lower end of the link 104$^a$ is connected with said lever 168$^a$ at a horizontal transverse axis at 172$^a$ between the ends of said lever 168. The upper end of said link 106$^a$ is pivotally connected with the forward end of said lever 168$^a$ at a transverse axis 174$^a$. It will be clear that vertical movements of the link 106$^a$ cause similar vertical movements of the link 104$^a$, said vertical movements of the link 104$^a$ being effected by the oscillation of the lever 168$^a$. The vertical movements of the link 104$^a$ are somewhat reduced in extent, but said movements effect collective pitch changes in the blades of the corresponding rotor 14, all as previously explained. The lever 168$^a$ constitutes a control member relatively movable about a pivotal axis at 170$^a$ which axis is movable and has a normal position. The normal position of the axis 170$^a$ is that shown in Fig. 5.

If the axis at 170$^a$ for the rock lever 168$^a$ were fixed in its said normal position, the pitches of the blades of the right rotor 14 would be changed and maintained so as to conform exactly to the normal pattern required for flight. However, the last said axis is not fixed but, on the contrary, is movable upwardly and downwardly in accordance with the described reciprocation of the rock lever 162$^a$. Said rock levers 168$^a$ and 162$^a$ are sometimes hereinafter referred to respectively as "first" and "second" rock levers. It will be seen that each upward or downward movement of the rock lever 162$^a$ and of the pin 170$^a$ causes an upward or a downward movement of said rock lever 168$^a$ and of the link 104$^a$, said upward or downward movements of the link being additional to any upward or downward movements thereof caused by the link 106$^a$. The said additional upward and downward movements or reciprocations of the link 104$^a$ are effected by the pin 150 of the actuating mechanism and by the parts driven thereby which constitute a connection or a train of parts extending to and including the link 104$^a$. There are two such reciprocations during each rotation of the right shaft 18 and of the right rotor 14. The axis 170$^a$ is therefore moved from and restored to its said normal position an integral plurality of times during each rotor rotation, and more specifically twice during each rotor rotation. This enables the control member 168$^a$ to cause the train of parts including the link 104$^a$ to change the collective pitches of all of the blades of the right rotor 14 in the same direction, these changes being effected twice during each rotation. As before stated, these impulses or pitch changes are so timed as to offset or compensate for the before-described harmonic vibrations which would otherwise occur twice during the rotation of the right rotor 14 and as the result of the action thereof. It has been before pointed out that upward movement of the rods 54$^a$, 56$^a$ causes increases in the pitches of the blades. Therefore, except for lag as hereinafter explained, the blade pitches are increased as the element 150 of the actuating mechanism moves rearwardly and as the levers 162$^a$ and 168$^a$ move upwardly from their said normal positions. Except for the said lag, the blade pitches are decreased as the element 150 moves forwardly. As shown, the pin 150 is near its rearmost position and the link 160 and the connected parts are near their uppermost positions. When there are two rotors a single anti-vibration means is provided which is common to both rotors. Preferably, the impulse or pitch changes are applied alternately to the blades of the two rotors.

For the pitch changing mechanism for the left rotor there is provided a rock lever 162 generally similar to the rock lever 162$^a$ and similarly movable on the transverse fixed pin 166. Interposed between the rock levers 162$^a$ and 162 is a transverse lever or walking beam 176 pivotally movable about the fixed axis of a longitudinal pin 178. Generally vertically links 180$^a$ and 180 respectively connect the levers 162$^a$ and 162 with the walking beam, said links being connected with said levers at axes which are equally spaced from the pivot pin 166. By means of the walking beam 176 and the links 180$^a$, 180, the lever 162 is reciprocated similarly to the lever 162$^a$ but oppositely.

It has been stated that the link 104 is indirectly connected with the link 106. The links are so connected by means of a rock lever 168 similar to the rock lever 168$^a$ and pivoted to the rock lever 162 at 172. The lower end of the link 104 is connected with said lever 168 at a horizontal transverse axis at 172 between the ends of said lever 168. The upper end of said link 106 is pivotally connected with the forward end of said lever 168 at a transverse axis 174. It will be clear that vertical movements of the link 106 cause similar vertical movements of the link 104, said vertical movements of the link 104 being effected by the oscillation of the lever 168. The vertical movements of the link 104 are somewhat reduced in extent, but said movements effect collective pitch changes in the blades of the corresponding rotor 12, all as previously explained.

If the axis at 170 for the rock lever 168 were fixed, the pitches of the blades of the left motor 12 would be changed and maintained so as to conform exactly to the normal pattern required for flight. However, the last said axis is not fixed but, on the contrary, is movable upwardly and downwardly in accordance with the described reciprocation of the rock lever 162. It will be seen that each upward or downward movement of the rock lever 162 and the pin 170 causes an upward or a downward movement of said rock lever 168 and of the link 104, said upward or downward movements of the link being additional to any upward or downward movements caused by the link 106. The last said upward and downward movements or reciprocations of the link 104 are effected by the same parts described for the link 104$^a$ together with the walking beam 176 and the links connected therewith. The actuating mechanism is driven by the right shaft 18, but the shafts 16 and 18 rotate at the same speed. Therefore, the vertical reciprocations of the link 104 change the collective pitches of the blades of the left rotor 12 or impart an impulse thereto twice during each rotation as previously described for the rotor 16.

It will be understood that by reason of the walking beam 176 the two anti-vibration mechanisms act alternately, each serving to effect a maximum pitch change in the blades of the corresponding rotor when there is no pitch change in the blades of the other rotor.

Timing of impulses or pitch changes

The impulses or changes in collective pitch are so timed as to offset or compensate for the before-described vibrations which would otherwise occur, these vibrations occurring twice during the rotation of each rotor and as the result of the action thereof. For a helicopter of the type disclosed a complete analysis shows that the two per revolution lift variation here involved is such that the lift is at its maximum in each blade when the blades extend transversely of the direction of flight and that the lift is at its minimum in each blade when the blades extend in the direction of flight. The timing of the impulses or pitch variations must be adjusted with respect to the direction of flight, and in the timing as hereinafter explained it is assumed that flight is in the forward direction or in the rearward direction. Therefore, the maximum pitch increase beyond the normal pattern should be reached when the blades extend longitudinally, there being no pitch increase beyond the normal pattern when the blades extend transversely. Furthermore, in connection with timing, due consideration must by given to the angular lag between a motion transmitted by the pitch changing mechanism and the completion of the actual pitch changes in the blades. For a helicopter of the type disclosed, this lag may be assumed to be 45° of rotor rotation.

Fig. 6 shows the azimuth bar 130ª and the pin 150 in the same positions as in Fig. 5. The bar 130ª is rotating clockwise and the pin 150 is rotating counterclockwise at twice the speed of rotation of the bar. The bar 130ª is longitudinal and the pin 150 is 30° from a longitudinal line through the axis of the gear 148. Each blade trails the said bar 130ª by 60° as indicated.

Referring to Fig. 7, one blade is indicated as being in longitudinal position and trailing the azimuth bar 130ª by 60°, the blade pitch according to the normal pattern being at its minimum. In this position the blade requires the maximum pitch increase beyond the normal pattern. In view of the fact that the rotative speed of said pin 150 is twice that of the rotor and of the bar 130ª, said pin has already moved 90° beyond its rearmost position and in the pitch decreasing direction, this serving to compensate for the said 45° lag in the establishment of the pitch change. When the blade has subsequently moved clockwise 90° from the position shown to a transverse position, the pin 150 will have moved counterclockwise 180° to the position 150ª and the blade pitch will have been decreased to the pitch represented by the normal pattern.

When the azimuth bar 130ª rotates from the Fig. 7 position to the Fig. 6 position, it will have additionally moved clockwise 120°, and at the same time the pin 150 will have additionally moved counterclockwise 240°. This places the pin 150 at the position shown in Fig. 6 when the bar 130ª is longitudinal. This last position is 30° from the rearmost position.

As previously stated, the rotors 12 and 14 are closely adjacent and are connected for rotation in unison and in opposite directions, the two rotors having their blades so related that those of each rotor are transverse when those of the other rotor are longitudinal. The blades of each rotor are then positioned 90° from those of the other, this relationship enabling the blades to intermesh without interference. Each of the described mechanisms imparts an impulse to its rotor twice during each rotation or every 180°, and the walking beam connection reverses the directions of the impulses for the two rotors so that each two successive impulses in the two mechanisms and in the same direction are 90° apart. This is the same as the angular positioning of the blades of the two rotors, the result being that the impulses imparted to the two rotors are so imparted with their blades in the same positions of rotation. In other words, the impulses are imparted alternately to the blades of the respective rotors.

Adjustment of timing and of magnitude

The hereinbefore described timing relationship is ordinarily preferable and is suited for forward or rearward flight. However, parts are included in the anti-vibration means which make it possible for timing of the impulses to be advanced or retarded. As shown, the timing is advanced or retarded by changing the meshing relationship between the gears 146 and 148, the timing being thus adjusted for optimum results. For lateral flight the timing is incorrect and the mechanism will not cancel the two per revolution vibrations and may even increase them. This may be ignored, or the anti-vibration mechanism may be made ineffective by reducing the magnitude of its action as hereinafter explained.

It is not only necessary to have the impulses or pitch changes properly timed, but it is also necessary to have the impulses of the correct magnitude. Too small impulses would be insufficient to cancel the vibrations and too large impulses would create objectionable vibrations of their own. In order to adjust the magnitude of the impulses, parts are interposed in the anti-vibration means for enabling the amplitude of the pitch changes to be increased or decreased.

As shown, the last said parts serve to vary the extent of the oscillation of the rock levers 162ª and 162. The pivot pins 158 for the rock lever 154 are not fixed but are adjustable in a generally longitudinal direction. Said pivot pins are carried by two similar links 184, 184 pivotally supported at their upper ends on pins 186, 186 which are in fixed positions and which align with each other. A longitudinal link 188 has a bifurcated yoke 190 at the rear end thereof, the bifurcations of the yoke engaging the pivot pins 158. The forward end of the link 188 is pivotally connected with a lever 192 pivotally movable about a fixed horizontal transverse axis at 194. The lever 192 is manually movable to move the pins 158 forwardly or rearwardly. Means, not shown, are provided for locking the lever 192 in any adjusted position.

It will be seen that the positions of the pins 158 determine the extent of reciprocation of the link 160. If the pins 158 are moved rearwardly from the position shown, the link 160 would be reciprocated to a greater extent. If the pins 158 are moved forwardly from the position shown, the link 160 would be reciprocated to a lesser extent. If the pins 158 are moved forwardly to a position directly below the axis at 156, the link 160 would have little or no reciprocation. Thus by means of the lever 192 and the parts connected therewith, the extent of reciprocation of the link 160 and the magnitude of the impulses imparted to the rotor blades can be varied between a maximum and approximately zero.

The vibrations to be corrected or reduced vary to a considerable extent with changing conditions of flight, and as before stated the described impulses ordinarily cannot completely compensate for the vibrations under every flight condition. However, the described impulses tending to compensate for the vibrations are adjusted, possibly as to timing but more commonly as to amplitude, so as to have the greatest average effectiveness. During lateral flight when the mechanism may be ineffective or even objectionable, the transmitted impulses or pitch changes may be reduced to zero by means of the lever 192.

Alternative mechanism—Figs. 8 and 9

Figs. 8 and 9 show a somewhat different pitch control mechanism for a helicopter of the general type shown in Figs. 1 to 4. The rotor carrying shafts 16 and 18 and the rods 54, 56 and 54ª, 56ª are or may be substantially identical with those shown in Figs. 1 and 5.

In lieu of the links 106, 106ª and associated parts for changing the collective pitches of the blades, links 196, 196ª are provided which may be moved vertically by means similar to those previously described. The links 196, 196ª are pivotally connected at the upper ends with the forward ends of levers 198, 198ª which are separately supported between their ends for movement about horizontal axes at 200, 200ª. The levers 198, 198ª are pivotally connected at their rear ends with the lower ends of upright rods 202, 202ª. For mechanical convenience the portion of the lever 198 that is connected with the link 196 may be transversely offset from the rear portion of said lever, but this is not essential. The rods 202, 202ª are connected indirectly with the rods 54, 56 and 54ª, 56ª so that upward and downward movements of the first said rods cause upward and downward movements of the second said rods with resultant collective pitch changes as previously described.

As more fully shown in Fig. 9, the mechanism for the right rotor includes a rotatable yoke 204ª generally similar in function to the yoke 128ª. The yoke 204ª is carried by the rod 202ª, said yoke being vertically movable with the rod and being universally adjustable relatively thereto by means of a self-adjustable bearing 206ª. The axis of rotation of the yoke 204ª is the azimuth axis. The yoke 204ª is connected with an azimuth bar 208ª similar to the azimuth bar 130ª, said bar 208ª being connected with the rods 54ª, 56ª. Connected with the yoke 204ª by means of a bearing 210ª is a control element 212ª. The element 212ª is adjustable in any direction by manually controlled mechanism, not shown, and the adjustment of the element 212ª serves to adjust the azimuth axis about which the yoke 204ª rotates, said axis being adjustable in any direction. Thus the blade pitches may be cyclically changed, the cyclic pitch changes being independent of the collective pitch changes.

The alternative anti-vibration means as shown and described comprises an actuating mechanism connected with the rotor or rotors for operation in synchronism with the rotation thereof, this means being similar to that previously described. Said alternative anti-vibration means also comprises a connection between said actuating mechanism and the pitch control mechanism of the helicopter for causing the last said mechanism, while otherwise maintaining the before-mentioned normal pitch pattern, to change the pitches of the blades from said pattern and restore them thereto an integral plurality of times during each rotation of the rotor.

The disclosed alternative actuating mechanism includes gears 210 and 212 similar respectively to the gears 146 and 148, the gear 212 carrying an eccentric pin 214 similar to the pin 150.

The connection between the actuating mechanism and the pitch control mechanism includes a generally longitudinal link 216 which engages at its rear end with said pin 214. The link 216 is connected at its forward end with a two-part rock lever 218, one of the lever parts being only incompletely shown. The connection between the link 216 and the lever 218, 218 is at a transverse horizontal axis 220. Sufficient flexibility is provided to permit the link 216 to oscillate in accordance with the movement of the pin 214. The rock lever 218, 218 is oscillable about the axis of two aligned transverse horizontal pivot pins 222, said axis being near the lower end of said rock lever. A generally vertical link 224 is pivotally connected at its upper end with said link 216 and with said rock lever 218, 218, the connection being at said axis 220. The lower end of the link 224 is connected at 226 with a generally longitudinal rock lever 228ª which is pivotally movable on a fixed horizontal transverse pin 229, said lever being oscillable upwardly and downwardly. For mechanical convenience, the link 224 is connected with a transversely offset portion 230ª of said lever 228ª. Connected with the lever 228ª for movement in unison therewith is a lever 231ª. From the foregoing description it will be apparent that as the gears 210 and 212 of the actuating mechanism are rotated, the link 216 reciprocates longitudinally. As the link 216 reciprocates, the rock lever 218, 218 oscillates and the link 224 reciprocates vertically. The vertical reciprocations of the link 224 cause the levers 228ª and 231ª to oscillate, the levers making two oscillations for each rotation of the shaft 18 and of the rotor 14.

It has been stated that the lever 198ª is movable about a horizontal axis at 200ª. Said axis is not fixed but is provided by a transverse pin on the rock levers 228ª and 231ª. When the levers 228ª and 231ª are moved upwardly the lever 198ª is moved upwardly so as to move the rod 202ª upwardly and thus collectively increase the pitches of the rotor blades. When the levers 228ª and 231ª are moved downwardly, the pitches are collectively decreased.

For the pitch changing mechanism for the left rotor there are provided rock levers 228 and 231 generally similar to the rock levers 228ª and 231ª and similarly movable on the transverse fixed pin 229. Interposed between the rock levers 231ª and 231 is a transverse lever or walking beam 232 pivotally movable about the fixed axis of a longitudinal pin 234. Generally vertical links 236ª and 236 respectively connect the levers 231ª and 231 with the walking beam, said links being connected with said levers at axes which are equally spaced from the pivot pin 229. By means of the walking beam 232 and the links 236ª, 236, the levers 228 and 231 being reciprocated similarly to the levers 228ª and 231ª but oppositely.

It has been stated that the lever 198 is movable about a horizontal axis at 200. Said axis at 200 is not fixed but is provided by a transverse pin on the rock levers 228 and 231. When the levers 228 and 231 are moved upwardly the lever 198 is swung upwardly so as to move the rod 202 upwardly and thus collectively increase the pitches of the rotor blades. When the levers 228 and 231 are moved downwardly the pitches are collectively decreased.

The timing of the mechanisms shown in Fig. 8 is or may be the same as that of the mechanisms shown in Fig. 5 and detailed explanation is unnecessary.

In order to adjust the magnitude of the impulses or pitch changes, parts are interposed in the anti-vibration means which are similar to those shown in Fig. 5. The pivot pin 222 for the rock lever 218, 218 is not fixed but is adjustable in a generally longitudinal direction. Said pivot pin is carried by two similar links 238, 238 pivotally supported at their upper ends on aligned fixed pins 240 of which only one is shown. A longitudinal link 242 is connected at its rear end with a pivot pin 244 near the bottom of the links 238, 238. The forward end of the link 242 is pivotally connected with a lever 246 pivotally movable about a fixed horizontal transverse axis at 248. The lever 246 is manually movable to move the pin 222 forwardly or rearwardly. Means, not shown, are provided for locking the lever 246 in any adjusted position. By means of the lever 246 and the parts connected therewith, the extent of reciprocation of the link 224 and the magnitude of the impulses imparted to the rotor blades can be varied between a maximum and approximately zero.

*Alternative mechanism—Fig. 10*

It has been herein previously stated that the present invention is not limited for use in a helicopter of the type disclosed in said Patent No. 2,695,674. In order that this fact may be more clearly evident, a helicopter of a different type is fragmentarily and schematically disclosed in Fig. 10, said last-mentioned helicopter having a single three-bladed rotor.

Referring to Fig. 10, the rotor of the helicopter includes a hub 250 having three projecting portions equally spaced circumaxially and each having similar upper and lower sections and each carrying a rotor blade. Two of said projecting portions are shown at 252 and 254. The hub 250 is carried by a sleeve 256 which is rotatable about a stationary mast 258. The blade and the connections therefor are the same for the said three arms, and only one blade 260 and its connections are shown. The hub portion 252 has a lag hinge pin, not shown, extending between the upper and lower sections thereof and having a vertical axis. A trunnion block 262 is pivotally mounted on said lag hinge pin between said sections of the arm 252. A yoke 264 embraces said trunnion block 262 and is connected therewith for movement about a horizontal flapping axis 266 preferably intersecting the before-mentioned vertical lag axis. The blade 260, or at least a supporting member therefor, is mounted on the yoke 264 for adjustment about a radial pitch axis, such adjustment serving to change the pitch of the blade.

A pitch control mechanism is provided for changing the pitches of the blades, and for each blade said mechanism includes an arm 268 having an offset portion 270. A rotary swash member is provided which has its axis of rotation normally coincident with the rotor axis, this member having three equally spaced arms and being shown schematically at 272. Substantially vertical links extend from the swash member 272 to the offset portions 270 of the arms 268, one of said links being shown at 274. The swash member 272 is movable vertically or angularly, in accordance with conventional practice, for collectively or cyclically changing the pitches of the blades by movement thereof about their radial pitch axes. Each link 274 and its connection with the corresponding arm portion 270 are preferably approximately in a vertical plane extending through the corresponding flappping axis 266. This arrangement eliminates or at least minimizes any pitch variations resulting from angular movements about said lag and flappping axes.

As shown, the swash member 272 is rotatably mounted on a nonrotatable vertical rod 276 which is centrally located within the hollow mast 258. Surrounding the rod 276 and fitting the mast 258 is a vertically movable nonrotatable sleeve 278. The rod 276 is connected with the sleeve 278 by means of a ball and socket joint 280, this joint causing the rod 276 and the swash member 272 to move vertically with the sleeve 278 and said joint also permitting angular or tilting movement of said rod and swash member relatively to said sleeve. The diameter of the sleeve is large enough to permit a substantial amount of tilting.

The sleeve 278 is movable vertically by means of a lever 282 pivotally connected at its rear end with the sleeve at 284, said lever being mounted for oscillation about a horizontal axis at 286. The lever is pivotally connected at its front end with a vertical link 288. The link 288 corresponds generally with one of the links 106, 106ª shown in Fig. 4. Vertical movement of the link 288 effects reversed vertical movement of the sleeve 278 and the rod 276 and the swash member 272. Upward movement of the swash member increases the pitches of the blades 260 and downward movement of said member decreases said pitches.

The rod 276 is connected at its lower end with a longitudinally movable longitudinal link 290 and with a transversely movable transverse link 292. By means of the links 290 and 292 the rod 276 and the swash member 272 can be tilted in any direction about the center of the ball and socket joint 280. Tilting of the swash member causes cyclic changes in the pitches of the blades 260, the action of said swash member being in accordance with conventional practice.

During helicopter flight the last before-described normal pitch control mechanism is operable for changing the pitches of the rotor blades 260 collectively or cyclically or both in accordance with a normal pattern as required for said flight. In accordance with the present alternative embodiment of the invention, the pitch control mechanism is caused to change the pitches of the blades 260 from their said normal pattern and to restore them to said normal pattern, the said changing and restoring of the pitches being effected three times during each rotation of the rotor.

The anti-vibration means as shown in Fig. 10 comprises an actuating mechanism connected with the rotor for operation in synchronism with the rotation thereof and it comprises a connection between said actuating mechanism and the pitch control mechanism of the helicopter for causing the last said mechanism, while otherwise maintaining the before-mentioned normal pitch pattern, to change the pitches of the blades from said pattern and to restore them thereto as before stated.

The disclosed actuating mechanism includes a gear 294 connected with the rotor sleeve 256, and said mechanism also includes a gear 296 which meshes with the gear 294 and is rotatable about a fixed axis parallel with said shaft. The gear 296 has one-third as many teeth as the gear 294 and therefore makes three rotations for each rotation of said gear 294. The gear 296 carries an eccentric pin 298 and said pin constitutes a relatively movable part having three repetitive movements during each rotation of the rotor. Said gears 294 and 296 are hereinafter sometimes referred to respectively as the "first" and "second" gears.

The connection between the actuating mechanism and the pitch control mechanism includes a generally longitudinal link 300 which engages at its rear end with said pin 298. The link 300 is connected at its forward end with a rock lever 302, the connection between the link and the lever being at a transverse horizontal pin 304. Sufficient flexibility is provided to permit the pin 304 to oscillate in accordance with the movement of the pin 298. The rock lever 302 is oscillable about a transverse horizontal pivot pin 306, said axis being near the lower end of said lever. A generally vertical link 308 is pivotally connected at its upper end with said pin 304. The link 308 is connected at its lower end with a generally longitudinal rock lever 310, the connection being at a horizontal transverse axis 312. The lever 310 is pivotally movable on a fixed horizontal transverse pin 314, said lever being oscillable upwardly and downwardly. From the foregoing description it will be apparent that as the gears 294 and 296 of the actuating mechanism are rotated, the link 300 reciprocates longitudinally. As the link 300 reciprocates, the rock lever 302 oscillates and the link 308 reciprocates vertically. The vertical reciprocations of the link 308 cause the lever 310 to oscillate, the lever making three oscillations for each rotation of the hub sleeve 256 and of the rotor.

The rear end of the rock lever 310 is connected with a vertical link 315. The link at its lower end carries the pivot pin 286 for the rock lever 282. If said axis at 286 for the rock lever 282 were fixed, the pitches of the rotor blades 260 would be changed and maintained so as to conform exactly to the normal pattern required for flight. However, the last said axis is not fixed but, on the contrary, is movable upwardly and downwardly in accordance with the described reciprocation of the rock lever 310. It will be seen that each upward or downward movement of the rear portion of the rock lever 310 and of the pin 286 causes an upward or a downward movement of said rock lever 282 and of the sleeve 278, the last said upward or downward movements of the sleeve being additional to any upward or downward movements thereof caused by the link 288. The vertical movements of the sleeve 278 change the collective pitches of the blades 260 of the rotor three times during each rotation.

The said additional upward and downward movements or reciprocations of the sleeve 278 are effected by the pin 298 of the actuating mechanism. When the pin 298 and the link 300 move rearwardly to the position shown in Fig. 10, they serve to move the rock lever 302 rearwardly and said lever causes the link 308 and the forward portion of said lever 310 to move downwardly and said lever 310 causes the link 315 and the lever 282 and the sleeve 278 to move upwardly and thus collectively increase the pitch of the blades. Thus with the parts in the positions shown, the pitch of the blades has been increased to the maximum extent. When the pin 298 and link 300 move forwardly, the action is reversed and the sleeve 278 moves downwardly to collectively decrease the pitch of the blades. These changes in collective pitch are so timed as to offset or compensate for the before-described vibrations which would otherwise occur three times during the rotation of the rotor and as the result of the action thereof.

It has been previously explained that, for a two-bladed rotor, the basic one per revolution vibrations are self-cancelling. Therefore the mechanism is constructed and adjusted to at least partially compensate for the vibrations which are the first harmonics of the basic one per revolution vibrations, said first harmonic vibrations being at the rate of two per revolution. It has been found by analysis that for a two-bladed rotor the normal lift is at its minimum when the blades extend longitudinally or in the direction of flight. Therefore each compensating pitch increase beyond the normal pattern must be effected when the blades extend longitudinally or in the direction of flight.

It has also been stated that when the rotor has more than two blades, vibrations caused by blade air loads at rates per revolution of less than the number of blades are self-cancelling at the rotor hub. For a rotor having three blades the lowest rate of vibration is therefore three vibrations for revolution and compensation is made for the second harmonic vibration, and not the first harmonic vibration. In order to compensate for said second harmonic vibration, it has been found that each pitch increase beyond the normal pattern must be effected when one blade is moving forwardly and is in a transverse position, the blade 260 shown in Fig. 10 being in this position. With a direct mechanical connection for changing the blade pitch, there is no lag in effecting the pitch changes such as has been described in connection with the helicopter shown in Figs. 1 to 7. It has been pointed out that rearward movement of the pin 298 increases blade pitch and therefore with one blade positioned transversely and with the other blades positioned correspondingly the pin 298 is in its rearmost position as shown. By the time that the next blade reaches the transverse position the gear 296 will have made a complete rotation and the pin 298 will have been moved forwardly and will then have returned to the rearward position to increase the pitch of said next following blade reaching said transverse position with the other blades positioned correspondingly.

The timing relationship approximately as shown and described will usually have the maximum effect in offsetting or cancelling vibrations. The described relationship is ordinarily preferable, but parts are included in the antivibration means which make it possible for timing of the impulses or pitch changes to be advanced or retarded. As shown, the timing is advanced or retarded by changing the meshing relationship between the gears 294 and 296, the timing being thus adjusted for optimum results.

In order to adjust the magnitude of the pitch changes, means are provided which serve to vary the extent of the oscillation of the rock lever 310. The pivot pin 306 for the rock lever 302 is not fixed but is adjustable in a generally longitudinal direction. Said pivot pin is carried by a link 316 pivotally supported at its upper end on a pin, not shown, which is in a fixed position. A longitudinal link 318 is pivotally connected at its rear end with the link 316. The forward end of the link 318 is pivotally connected with a lever 320 pivotally movable about a fixed horizontal transverse axis at 322. The lever 320 is manually movable to move the link 316 and the pin 306 forwardly or rearwardly. Means, not shown, are provided for locking the lever 320 in any adjusted position.

It will be seen that the positions of the pin 306 determine the extent of reciprocation of the link 308. If the pin 306 is moved forwardly from the position shown, the link 308 would be reciprocated to a greater extent. If the pin is moved rearwardly from the position shown, the link 308 would be reciprocated to a lesser extent. If the pin 306 is moved to a position directly below the axis at 304, the link 308 would have little or no reciprocation. Thus by means of the lever 320 and the parts connected therewith, the extent of reciprocation of the link 308 and the magnitude of the pitch changes imparted to the rotor blades can be varied between a maximum and approximately zero.

The invention claimed is:

1. The combination in a helicopter, of a multi-bladed sustaining rotor, pitch control mechanism operable for changing the pitches of the rotor blades during rotor rotation in accordance with a normal pitch pattern as required for flight, and a single anti-vibration means common to all blades for imparting similar and simultaneous impulses to all of said blades an integral plurality of times during each rotation of said rotor, said anti-vibration means being so constructed and so related to said pitch control mechanism that said impulses are imparted to the blades while the last said mechanism otherwise maintains said normal pitch pattern.

2. The combination in a helicopter, of a sustaining rotor with a plurality of blades, pitch control mechanism operable for changing the pitches of the rotor blades during rotor rotation in accordance with a normal pitch pattern as required for flight, and a single anti-vibration means common to all blades for imparting similar and simultaneous impulses to all of said blades an integral plurality of times during each rotation of said rotor which last said plurality is the same as that of the blades, said anti-vibration means being so constructed and so related to said pitch control mechanism that said impulses are imparted to the blades while the last said mechanism otherwise maintains said normal pitch pattern.

3. The combination in a helicopter, of a multi-bladed sustaining rotor, pitch control mechanism operable for changing the pitches of the rotor blades during rotor rotation in accordance with a normal pitch pattern as required for flight which mechanism includes a vertically movable control member and an azimuth member carried by the control member and rotatable about an angularly adjustable axis, and antivibration means connected with said pitch control mechanism for reciprocating said control member to simultaneously effect similar brief pitch changes in all of the blades which changes are effected an integral plurality of times during each rotation of the rotor and are superimposed upon said normal pitch pattern while said pattern is otherwise unchanged.

4. The combination in a helicopter, of a sustaining rotor having two oppositely disposed blades, pitch control mechanism operable for changing the pitches of the rotor blades collectively and cyclically during rotor rotation in accordance with a normal pitch pattern as required for flight which mechanism includes a vertically movable control member and an azimuth member carried by the control member and rotatable about an angularly adjustable axis, and antivibration means connected with said pitch control mechanism for reciprocating said control member to simultaneously effect similar brief pitch changes in both of the blades which changes are effected twice during each rotation of the rotor and are superimposed upon said normal pitch pattern while said pattern is otherwise unchanged.

5. The combination in a helicopter, of a multi-bladed sustaining rotor, pitch control mechanism operable for changing the pitches of the rotor blades collectively and cyclically during rotor rotation in accordance with a normal pitch pattern as required for flight which mechanism includes a vertically movable control member and an azimuth member carried by the control member and rotatable about an angularly adjustable axis, and antivibration means connected with said pitch control mechanism for upwardly moving said control member to collectively increase the pitches of all of the blades simultaneously and to the same extent from those of said pitch pattern and for downwardly moving said control member to collectively reduce the pitches of all of the blades simultaneously and to the same extent so as to restore said pitches to those of said pitch pattern, said anti-vibration means being constructed and arranged to upwardly and downwardly move said control member an integral plurality of times during each rotation of the rotor and while the pitch control mechanism otherwise maintains said normal pitch pattern.

6. The combination in a helicopter normally movable in a longitudinal direction, of a sustaining rotor rotatable about a substantially vertical axis and having a hub and two oppositely disposed blades each connected with the hub for pivotal movement about a horizontal axis, pitch control mechanism operable for changing the pitches of the rotor blades collectively and cyclically during rotor rotation in accordance with a normal pitch pattern as required for flight which mechanism includes a vertically movable control member and an azimuth member carried by the control member and rotatable about an angularly adjustable axis, and anti-vibration means connected with said pitch control mechanism for reciprocating said control member to collectively increase the pitches of the blades from those of said pitch pattern when said blades are longitudinal and to collectively reduce the pitches of the blades to those of said pattern when said blades are transverse.

7. The combination in a helicopter of a multi-bladed sustaining rotor, pitch control mechanism operable for changing the pitches of the rotor blades collectively and cyclically during rotor rotation in accordance with a normal pitch pattern as required for flight which mechanism includes a vertically movable control member and an azimuth member carried by the control member and rotatable about an angularly adjustable axis, and anti-vibration means connected with said pitch control mechanism for reciprocating said control member to simultaneously effect similar brief pitch changes in all of the blades which changes are superimposed upon said normal pitch pattern while said pattern is otherwise unchanged, said anti-vibration means being constructed and arranged to effect said superimposed brief pitch changes in all of the blades an integral plurality of times during each rotation of the rotor and said anti-vibration means including parts enabling the timing of said means to be changed with respect to the rotation of the rotor.

8. The combination in a helicopter, of a multi-bladed sustaining rotor, pitch control mechanism operable for changing the pitches of the rotor blades collectively and cyclically during rotor rotation in accordance with a normal pitch pattern as required for flight which mechanism includes a vertically movable control member and an azimuth member carried by the control member and rotatable about an angularly adjustable axis, and anti-vibration means connected with said pitch control mechanism for reciprocating said control member to superimpose brief pitch changes in all of the blades which pitch changes are superimposed upon said normal pitch pattern while said pattern is otherwise unchanged, said anti-vibration means being constructed and arranged to effect said superimposed brief pitch changes in all of the blades an integral plurality of times during each rotation of the rotor, and said anti-vibration means including parts enabling the amplitude of the changes in pitches to be increased or decreased.

9. Anti-vibration means for a helicopter having a multi-bladed sustaining rotor and having pitch control mechanism operable for changing the pitches of the rotor blades during rotor rotation in accordance with a normal pitch pattern as required for flight, said anti-vibration means comprising an actuating mechanism separate from the rotor and connected therewith for operation in synchronism with the rotation thereof, and a connection between said actuating mechanism and said pitch control mechanism for causing the last said mechanism while otherwise maintaining said normal pitch pattern to change the pitches of the blades from those of said pattern and to restore the pitches of the blades to those of said pattern an integral plurality of times during each rotation of the rotor.

10. Anti-vibration means for a helicopter having a multi-bladed sustaining rotor and having pitch control mechanism operable for changing the pitches of the rotor blades during rotor rotation in accordance with a normal pitch pattern as required for flight, said anti-vibration means comprising an actuating mechanism separate from the rotor and connected therewith for operation in synchronism with the rotation thereof, said actuating mechanism including parts enabling the timing of said mechanism to be changed with respect to the rotation of the rotor, and a connection between said actuating mechanism and said pitch control mechanism for causing the last said mechanism while otherwise maintaining said normal pitch pattern to change the pitches of the blades from those of said pattern and to restore the pitches of the blades to those of said pattern an integral plurality of times during each rotation of the rotor.

11. Anti-vibration means for a helicopter having a multi-bladed sustaining rotor and having pitch control mechanism operable for changing the pitches of the rotor blades during rotor rotation in accordance with a normal pitch pattern as required for flight, said anti-vibration means comprising an actuating mechanism separate from the rotor and connected therewith for operation in synchronism with the rotation thereof, said actuating mechanism including parts enabling the timing of said mechanism to be changed with respect to the rotation of the rotor, and a connection between said actuating mechanism and said pitch control mechanism for causing the last said mechanism while otherwise maintaining said normal pitch pattern to change the pitches of the blades from those of said pattern and to restore the pitches of the blades to those of said pattern an integral plurality of times during each rotation of the rotor, said connection including parts enabling the amplitude of the changes in pitches to be increased or decreased.

12. Anti-vibration means for a helicopter having a multi-bladed sustaining rotor and having pitch control mechanism operable for changing the pitches of the rotor blades during rotor rotation in accordance with a normal pitch pattern as required for flight, said anti-vibration means comprising an actuating mechanism separate from the rotor and connected therewith and including a relatively movable part and also including means for causing said part to have an integral plurality of repetitive movements during each rotation of the rotor, and a connection between said movable part of the actuating mechanism and said pitch control mechanism for causing the last said mechanism while otherwise maintaining said normal pitch pattern to act during each said movement of said relatively movable part so as to change the pitches of the blades from those of said normal pattern and to restore the pitches of the blades to those of said pattern.

13. Anti-vibration means for a helicopter having a multi-bladed sustaining rotor and having pitch control mechanism operable for changing the pitches of the rotor blades during rotor rotation in accordance with a normal pitch pattern as required for flight, said anti-vibration means comprising an actuating mechanism including a first gear separate from the rotor and rotatable in unison therewith and a second rotatable gear meshing with said first gear with the number of teeth of the first gear an integral multiple of the number of teeth of the second gear and said actuating mechanism also including an eccentric pin carried by said second gear so as to make an integral plurality of revolutions during each rotation of the first gear and of the rotor, and a connection between said pin on the second gear of the actuating mechanism and said pitch control mechanism for causing the last said mechanism while otherwise maintaining said normal pitch pattern to act during each said revolution of said pin so as to change the pitches of the blades from those of said normal pattern and to restore the pitches of the blades to those of said pattern.

14. The combination in a helicopter, of a multi-bladed sustaining rotor; pitch control mechanism having a train of parts for the transmission of motion to change the pitches of the rotor blades during rotor rotation in accordance wih a normal pitch pattern as required for flight, said train of parts including a control member relatively movable about a movable pivotal axis having a normal position; and an anti-vibration means comprising: an actuating mechanism separate from the rotor and connected therewith for operation in synchronism with the rotation thereof, and a connection between said actuating mechanism and said movable axis of said control member for moving said axis from and restoring it to its said normal position an integral plurality of times during each rotation of the rotor so as to move said control member relatively to other parts and thereby cause said train of parts while otherwise maintaining said normal pitch pattern to change the pitches of the blades from those of said pattern and to restore the pitches of the blades to those of said pattern during each movement of said movable axis.

15. The combination in a helicopter, of a multi-bladed sustaining rotor; pitch control mechanism having a train of parts for the transmission of motion to change the pitches of the rotor blades during rotor rotation in accordance with a normal pitch pattern as required for flight, said train of parts including a rock lever movable about a pivotal axis having a normal position; and an anti-vibration means comprising: an actuating mechanism separate from the rotor and connected therewith for operation in synchronism with the rotation thereof, and a connection between said actuating mechanism and the pivotal axis of said rock lever for moving said axis from and restoring it to its said normal position an integral plurality of times during each rotation of the rotor so as to move said rock lever and thereby cause said train of parts while otherwise maintaining said normal pitch pattern to change the pitches of the blades from those of said pattern and to restore the pitches of the blades to those of said pattern during each movement of said lever.

16. The combination in a helicopter, of a multi-bladed sustaining rotor; pitch control mechanism having a train of parts for the transmission of motion to change the pitches of the rotor blades during rotor rotation in accordance with a normal pitch pattern as required for flight, said train of parts including a first rock lever movable about a pivotal axis having a normal position; and an anti-vibration means comprising: an actuating mechanism separate from the rotor and connected therewith for operation in synchronism with the rotation thereof, a second rock lever to which the first rock lever of the pitch control mechanism is connected at said axis which second rock lever is movable about a fixed pivotal axis and has a normal position, a connection between said actuating mechanism and said second rock lever for moving it about its said pivotal axis from its said normal position and restoring it to said position an integral plurality of times during each rotation of the rotor, said second rock lever moving the pivotal axis of said first rock lever and thereby causing said train of parts while otherwise maintaining said normal pitch pattern to change the pitches of the blades from those of said pattern and to restore the pitches of the blades to those of said pattern during each movement of said second lever.

17. The combination in a helicopter having a multi-bladed sustaining rotor, pitch control mechanism including a means for collectively changing the pitches of the rotor blades and also including a means for cyclically changing the pitches of the rotor blades which collectively and cyclically operable means cooperate to change the pitches during rotor rotation as required for flight, said means for collectively changing the pitches of the blades having a train of parts for the transmission of motion to change said pitches which train includes a control member relatively movable about a movable pivotal axis having a normal position, an actuating mechanism separate from the rotor and connected therewith for operation in synchronism with the rotation thereof, and a connection between said actuating mechanism and said movable axis of said control member for moving said axis from and restoring it to its said normal position an integral plurality of times during each rotation of the rotor so as to move said contol member relatively to other parts and thereby cause said train of parts while otherwise maintaining said normal pitch pattern to collectively change the pitches of the blades from those of said pattern and to restore the pitches of the blades to those of said pattern during each movement of said movable axis.

18. The combination in a helicopter, of a multi-bladed sustaining rotor; pitch control mechanism operable for changing the pitches of the rotorblades during rotor rotation in accordance with a normal pitch pattern as required for flight; and an anti-vibration means comprising: an actuating mechanism separate from the rotor and connected therewith for operation in synchronism with the rotation thereof and including a relatively movable part and also including means for causing said movable part to have an integral plurality of repetitive movements during each rotation of the rotor, and a connection between said movable part of the actuating mechanism and said pitch control mechanism for causing the last said mechanism while otherwise maintaining said normal pitch pattern to act during each said movement of said part so as to change the pitches of the blades from those of said normal pattern and to restore the pitches of the blades to those of said pattern, the said connection including parts enabling the amplitude of the changes in pitches to be increased or decreased.

19. The combination in a helicopter, of a multi-bladed sustaining rotor; pitch control mechanism operable for changing the pitches of the rotor blades during rotor rotation in accordance with a normal pitch pattern as required for flight; and an anti-vibration means comprising: an actuating mechanism separate from the rotor and connected therewith for operation in synchronism with the rotation thereof and including a relatively movable part and also including means for causing said part to have an integral plurality of repetitive movements during each rotation of the rotor, a connection between said movable part of the actuating mechanism and said pitch control mechanism for causing the last said mechanism while otherwise maintaining said normal pitch pattern to act during each said movement of said part so as to change the pitches of the blades from those of said normal pattern and to restore the pitches of the blades to those of said pattern, the said connection including two links at an angle to each other and also including a rock lever movable about a pivotal axis and having both links pivotally connected therewith, and means for changing the position of the axis of the rock lever and for thus causing the amplitude of the changes in pitches to be increased or decreased.

20. The combination in a helicopter of two similar multi-bladed sustaining rotors rotatable at uniform speeds and in opposite directions, two pitch control mechanisms operable respectively for changing the pitches of the blades of said rotors during rotor rotation in accordance with a normal pitch pattern as required for flight, and a single anti-vibration means common to both rotors for imparting impulses to all of the blades of each rotor an integral plurality of times during each rotation of said rotor, said anti-vibration means being so constructed and so related to said pitch control mechanisms that said impulses are imparted to the blades while the last said mechanisms otherwise maintain said normal pitch pattern.

21. The combination in a helicopter of two similar closely adjacent multi-bladed sustaining rotors rotatable at uniform speeds and in opposite directions which rotors have their blades relatively positioned to intermesh during rotation, two pitch control mechanisms operable for changing the pitches of the blades of said rotors during rotor rotation in accordance with a normal pitch pattern as required for flight, and a single anti-vibration means common to both rotors for imparting impulses to all of the blades of each rotor an integral plurality of times during each rotation of said rotor, said anti-vibration means being so constructed and so related to said pitch control mechanisms that said impulses are imparted to the blades while the last said mechanisms otherwise maintain said normal pitch pattern.

22. The combination in a helicopter of two similar closely adjacent multi-bladed sustaining rotors rotatable at uniform speeds and in opposite directions which rotors have their blades relatively positioned to intermesh during rotation, pitch control mechanisms operable for changing the pitches of the blades of both rotors during rotor rotation in accordance with a normal pitch pattern as required for flight, each of which mechanisms includes a vertically movable control member and an azimuth member carried by the control member and rotatable about an angularly adjustable axis, and a single anti-vibration means connected with said pitch control mechanisms for reciprocating both of said control members an integral plurality of times during each rotation, each of said control members serving to simultaneously effect similar brief pitch changes in all of the blades of the corresponding rotor which changes are superimposed upon said normal pitch pattern while said pattern is otherwise unchanged.

23. The combination in a helicopter of two similar closely adjacent sustaining rotors rotatable at uniform speeds and in opposite directions which rotors have their blades relatively positioned to intermesh during rotation, pitch control mechanisms operable for changing the pitches of the blades of both rotors during rotor rotation in accordance with a normal pitch pattern as required for flight, each of which mechanisms includes a vertically movable control member and an azimuth member carried by the control member and rotatable about an angularly adjustable axis, and a single anti-vibration means connected with said pitch control mechanisms for reciprocating both of said control members in opposite directions an integral plurality of times during each rotation, each of said control members serving to simultaneously effect similar brief pitch changes in all of the blades of the corresponding rotor which changes are superimposed upon said normal pitch pattern while said pattern is otherwise unchanged.

24. The combination in a helicopter of two similar closely adjacent multi-bladed sustaining rotors each having two oppositely disposed blades which rotors are rotatable at uniform speeds and in opposite directions and have their blades relatively positioned to intermesh during rotation, pitch control mechanisms operable for changing the pitches of the blades of both rotors during rotor rotation in accordance with a normal pitch pattern as required for flight, each of which mechanisms includes a vertically movable control member and an azimuth member carried by the control member and rotatable about an angularly adjustable axis, and a single anti-vibration means including an actuating mechanism separate from the rotors and connected with one of them for operation in synchronism with the rotation thereof, and a connection between said actuating mechanism and said pitch control mechanisms for reciprocating both of said control members in opposite directions an integral plurality of times during each rotation, each of said control members serving to simultaneously effect similar brief pitch changes in all of the blades of the corresponding rotor which changes are superimposed upon said normal pitch pattern while said pattern is otherwise unchanged.

25. The combination in a helicopter of two similar closely adjacent sustaining rotors rotatable at uniform speeds and in opposite directions which rotors have their blades relatively positioned to intermesh during rotation; two pitch control mechanisms operable for changing the pitches of the blades of the respective rotors during rotor rotation in accordance with a normal pitch pattern as required for flight, and anti-vibration means comprising: an actuating mechanism connected with one rotor for operation in synchronism with the rotation thereof, and a connection between said actuating mechanism and said two pitch control mechanisms for causing the last said mechanisms while otherwise maintaining said normal pitch pattern to change the pitches of the blades from those of said pattern and to restore the pitches of the blades to those of said pattern an integral plurality of times during each rotation of the rotor, said anti-vibration means being constructed and arranged to alternately change the pitches of the blades of the respective rotors.

26. The combination in a helicopter of two similar closely adjacent sustaining rotors rotatable at uniform speeds and in opposite directions which rotors have their blades relatively positioned to intermesh during rotation; two pitch control mechanisms operable for changing the pitches of the blades of the respective rotors during rotor rotation in accordance with a normal pitch pattern as required for flight, each pitch control mechanism comprising a train of parts including a first rock lever movable about a pivotal axis having a normal position, and an anti-vibration means comprising: an actuating mechanism connected with one rotor for operation in synchronism with the rotation thereof; two second rock levers to which the first rock levers of the two pitch control mechanisms are respectively connected at said pivotal axes thereof which second rock levers are pivotally movable about a common fixed pivotal axis and have normal positions, a connection between said actuating mechanism and said second rock levers for moving them oppositely about said fixed pivotal axis from their said normal positions and restoring them to such positions an integral plurality of times during each rotation of the rotors, said second rock levers moving the pivotal axes of said first rock levers and thereby causing said trains of parts while otherwise maintaining said normal pitch pattern to change the pitches of the blades of said rotors from those of said pattern and to restore the pitches of the blades to those of said pattern during each movement of said second levers.

References Cited in the file of this patent

UNITED STATES PATENTS

| | | |
|---|---|---|
| 2,514,749 | Dobbins | July 11, 1950 |
| 2,521,012 | Kay et al. | Sept. 5, 1950 |
| 2,620,888 | Avery | Dec. 9, 1952 |
| 2,652,898 | Renoux | Sept. 22, 1953 |
| 2,695,674 | Kaman et al. | Nov. 30, 1954 |

FOREIGN PATENTS

| | | |
|---|---|---|
| 715,119 | Great Britain | Sept. 8, 1954 |